(12) United States Patent
Grancharov et al.

(10) Patent No.: US 11,216,956 B2
(45) Date of Patent: Jan. 4, 2022

(54) INDICATING OBJECTS WITHIN FRAMES OF A VIDEO SEGMENT

(71) Applicant: Telefonaktiebolaget LM Ericsson (publ), Stockholm (SE)

(72) Inventors: Volodya Grancharov, Solna (SE); Sigurdur Sverrisson, Kungsängen (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/771,782

(22) PCT Filed: Dec. 13, 2017

(86) PCT No.: PCT/EP2017/082689
§ 371 (c)(1),
(2) Date: Jun. 11, 2020

(87) PCT Pub. No.: WO2019/114954
PCT Pub. Date: Jun. 20, 2019

(65) Prior Publication Data
US 2021/0201505 A1    Jul. 1, 2021

(51) Int. Cl.
*G06K 9/00* (2006.01)
*G06T 7/246* (2017.01)
*G06K 9/62* (2006.01)

(52) U.S. Cl.
CPC ............ *G06T 7/248* (2017.01); *G06K 9/6211* (2013.01); *G06T 2207/10016* (2013.01); *G06T 2207/30196* (2013.01); *G06T 2207/30221* (2013.01)

(58) Field of Classification Search
CPC ........... G06T 7/248; G06T 2207/10016; G06T 2207/30196; G06T 2207/30221; G06T 2207/30241; G06K 9/6211; G06K 9/00758
(Continued)

(56) References Cited

U.S. PATENT DOCUMENTS

2010/0150408 A1    6/2010   Ishikawa
2011/0081043 A1*   4/2011   Sabol ..................... G06T 7/254
                                                                  382/103
(Continued)

OTHER PUBLICATIONS

International Search Report and Written Opinion of the International Searching Authority, PCT/EP2017/082689, dated Aug. 6, 2018, 13 pages.
(Continued)

*Primary Examiner* — Stephen P Coleman
(74) *Attorney, Agent, or Firm* — Sage Patent Group

(57) ABSTRACT

A method of providing an indication of objects in frames of a video segment and a video processor configured to perform such a method are described. First and second frames from the video segment are analyzed and candidate objects in the frames are determined. First and second sets of candidate objects in the frames are created that provide a size and location of each candidate object along with a probability that the determination as a candidate object is correct. Candidate objects that are determined to be the same object present in both the first and second frames are found. If the probability that the determination as a candidate object is correct from the second set is lower than the probability for the corresponding candidate object in the first set, the second set is amended by increasing the probability for the candidate object.

20 Claims, 9 Drawing Sheets

(58) Field of Classification Search
USPC .......................................................... 382/195
See application file for complete search history.

(56) References Cited

U.S. PATENT DOCUMENTS

| | | |
|---|---|---|
| 2013/0266226 A1 | 10/2013 | Zhang et al. |
| 2014/0104313 A1 | 4/2014 | Matsumoto |
| 2015/0138345 A1 | 5/2015 | Liao et al. |
| 2018/0068431 A1* | 3/2018 | Takeda ..................... G06T 7/70 |

OTHER PUBLICATIONS

Ren, Shaoqing et al., "Faster R-CNN: Towards Real-Time Object Detection with Region Proposal Networks," Advances in Neural Information Processing Systems 28 (NIPS 2015), 14 pages.
Hosang, Jan et al., "How good are detection proposals, really?" Proceedings British Machine Vision Conference 2014, 25 pages.
Hosang, Jan et al., "What makes for effective detection proposals?" IEEE Transactions on Pattern Analysis and Machine Intelligence, Apr. 2016, 16 pages.
Indian Examination Report dated Jul. 13, 2021 for Indian Patent Application No. 202017022224, 7 pages.

* cited by examiner

| # | x | y | w | h | p |
|---|---|---|---|---|---|
| 1 | 0.1857 | 0.3111 | 0.0405 | 0.1042 | 0.0119 |
| 2 | 0.2666 | 0.2917 | 0.0324 | 0.1192 | 0.0000 |
| ... | ... | ... | ... | ... | ... |
| 4800 | 0.2562 | 0.9598 | 0.0581 | 0.0696 | 0.0374 |

*FIG. 3*

| # | x | y | w | h | p |
|---|---|---|---|---|---|
| 1 | 0.3385 | 0.6566 | 0.0445 | 0.1587 | 0.7150 |
| 2 | 0.4189 | 0.6184 | 0.453 | 0.1483 | 0.6967 |
| ... | ... | ... | ... | ... | ... |
| 25 | 0.1146 | 0.9171 | 0.0412 | 0.1269 | 0.0031 |

|  | i=1 | i=2 | i=3 |
|---|---|---|---|
| j=1 | 0.8 | 0.1 | 0.5 |
| j=2 | 1.2 | 0.5 | 0.9 |
| j=3 | 0.3 | 1.4 | 0.7 |

FIG. 6A

|  | i=1 | i=2 | i=3 |
|---|---|---|---|
| j=1 | REALMAX | REALMAX | REALMAX |
| j=2 | 1.2 | REALMAX | 0.9 |
| j=3 | 0.3 | REALMAX | 0.7 |

FIG. 6B

|  | i=1 | i=2 | i=3 |
|---|---|---|---|
| j=1 | REALMAX | REALMAX | REALMAX |
| j=2 | REALMAX | REALMAX | 0.9 |
| j=3 | REALMAX | REALMAX | REALMAX |

FIG. 6C

INDICATING OBJECTS WITHIN FRAMES OF A VIDEO SEGMENT

CROSS REFERENCE TO RELATED APPLICATIONS

This application is a 35 U.S.C. § 371 national stage application of PCT International Application No. PCT/EP2017/082689 filed on Dec. 13, 2017, the disclosure and content of which is incorporated by reference herein in its entirety.

TECHNICAL FIELD

The present invention relates to providing an indication of objects in frames of a video segment.

BACKGROUND

Object detectors such as a video processor may be used in video processing to indicate one of more objects that may appear in a frame of a video. An indication may be provided as to the position of the object, to the size of an object and to the type of the object, or any combination of these. The type of the object may be recognized as an object class, for example a vehicle, person, animal or building.

Methods of indicating objects in a frame of a video are known. For example, the following documents discuss such methods.

*Faster R-CNN: Towards Real-Time Object Detection with Region Proposal* Networks by Shaoqing Ren, Kaiming He, Ross Girshick, and Jian Sun, presented at NIPS 2015, and published in Advances in Neural Information Processing Systems 28, available from https://arxiv.org/abs/1506.01497 (as of 12 Dec. 2017).

*How good are detection proposals, really?* by Jan Hosang, Rodrigo Benenson and Bernt Schiele, available from https://arxiv.org/abs/1406.6962 (as of 12 Dec. 2017).

*What makes for effective detection proposals?* by Jan Hosang, Rodrigo Benenson, Piotr Dollar and Bernt Schiele, available from https://arxiv.org/abs/1502.05082 (as of 12 Dec. 2017).

Object detectors, such as those described in the documents referenced, use networks that depend on region proposal algorithms to hypothesize object locations within a video frame. For example, under the assumption that all objects of interest share common visual properties that distinguish them from the background, a method is designed or trained that outputs a set of proposal regions within the frame that are likely to contain objects.

These methods tend to calculate a large number of candidate objects for each frame, for example 4800 candidate objects. The candidate objects may be represented as a matrix. Each row of the matrix may represent one candidate object, with columns specifying the position and size of the candidate object. The position and size may be defined relative to a bounding box that encloses the candidate object. The columns may define the height and width of the bounding box, and the position may be an anchor point for constructing the bounding box such as a center point or a corner of the bounding box. A column is also included to provide a confidence score for each candidate object identified, namely a calculated probability of a correct identification as an object.

The set of candidate objects contained in the matrix are simply thresholded to provide a list of objects. Specifically, the probability provided for each candidate object is compared to a threshold and candidate objects are assigned to the list if their probability exceeds the threshold value. The list of objects may then be output. An overlay may be provided when the video frame is displayed, for example to indicate all or some of the objects from the output list, such as by showing the outline of bounding boxes or by displaying markers below, above or alongside the objects.

SUMMARY

According to an embodiment of the invention, a method of providing an indication of objects in frames of a video segment is provided. The method comprises, for a plurality of successive pairs of successive frames of the video segment, performing steps (i) to (vi) below.

(i) The method comprises analyzing a first frame from the video segment and determining candidate objects in the frame. The video segment may be an entire video or may be a part of a video such as an excerpt taken from a video. The method further comprises creating a first set of candidate objects in the first frame that provides, for candidate objects in the set, a size and location of the candidate object along with a probability that the determination as a candidate object is correct. A size and location of each candidate object in the first set may be provided, along with a probability that the determination as a candidate object is correct.

(ii) The method comprises analyzing a second frame from the video segment and determining candidate objects in the second frame. The first frame precedes the second frame. For example, the first frame may immediately precede the second frame in the video segment. In this arrangement, all frames of the video segment are processed. In alternative arrangements, the first frame need not immediately precede the second frame. For example, every other frame may be processed or every third frame, etc. may be processed.

The method further comprises creating a second set of candidate objects in the second frame that provides, for each candidate object in the set, a size and location of the candidate object and a probability that the determination as a candidate object is correct. A size and location of each candidate object in the second set may be provided, along with a probability that the determination as a candidate object is correct.

(iii) The method comprises comparing the second set of candidate objects with the first set of candidate objects to find pairs of corresponding candidate objects that are determined to be the same object present in both the first frame and the second frame. Hence, of a pair, one candidate object is selected from the second set of candidate objects and one candidate object is selected from the first set of candidate objects.

(iv) For at least some pairs of corresponding objects found and, optionally, for each pair of corresponding objects found, the method comprises determining whether the probability that the determination as a candidate object is correct from the second set of candidate objects is lower than the probability that the determination as a candidate object is correct from the first set of candidate objects. If the probability that the determination as a candidate object is correct from the second set of candidate objects is lower than the probability that the determination as a candidate object is correct from the first set of candidate objects, the method comprises amending the second set of candidate objects by increasing the probability that the determination as a candidate object is correct such that the amended second set of candidate objects includes the increased probabilities.

(v) The method comprises selecting objects from the amended second set of candidate objects and generating an output set of the selected objects. The set of selected objects provides, for selected objects in the output set (e.g. for all selected objects in the output set), a size and location of the selected object.

(vi) The method comprises outputting the output set.

The method steps described above and in the following paragraphs of this summary section may be performed by a video processor.

Hence, according to a further embodiment of the invention, a method of using a video processor to provide an indication of objects in frames of a video segment is provided. The method comprises, for a plurality of successive pairs of successive frames of the video segment, the video processor performing steps (a) to (f) below.

(a) The method comprises the video processor analyzing a first frame from the video segment and determining candidate objects in the frame. The method further comprises the video processor creating a first set of candidate objects in the first frame that provides, for each candidate object in the set, a size and location of the candidate object along with a probability that the determination as a candidate object is correct.

(b) The method further comprises the video processor analyzing a second frame from the video segment and locating candidate objects in the second frame. The first frame precedes the second frame. The method further comprises the video processor creating a second set of candidate objects in the second frame. The second set of candidate objects provides, for each candidate object in the set, a size and location of the candidate object and a probability that the determination as a candidate object is correct.

(c) The method comprises the video processor comparing the second set of candidate objects with the first set of candidate objects to find pairs of corresponding candidate objects that are determined to be the same object present in both the first and second frames. One object is selected from the second set of candidate objects and one object is selected from the first set of candidate objects.

(d) For each pair of corresponding objects found, the method comprises the video processor determining whether the probability that the determination as a candidate object is correct from the second set of candidate objects is lower than the probability that the determination as a candidate object is correct from the first set of candidate objects. If the probability that the determination as a candidate object is correct from the second set of candidate objects is lower than the probability that the determination as a candidate object is correct from the first set of candidate objects, the method comprises the video processor amending the second set of candidate objects by increasing the probability that the determination as a candidate object is correct such that the amended second set of candidate objects includes the increased probabilities.

(e) The method further comprises the video processor selecting objects from the amended second set of candidate objects and generating an output set of the selected objects. The output set provides, for selected objects in the output set (e.g. for all selected objects in the output set), a size and location of the selected object.

(f) The method further comprises the video processor outputting the output set.

The following paragraphs apply to both methods described above, i.e. irrespective of whether or not the method steps are performed by a video processor.

Unlike the prior art, the methods presented herein take account of more than one frame at a time. In the prior art, each frame is processed independently and a list of candidate objects produced for each frame that pays no regard to the preceding frames. This can lead to a number of problems such as false positives (i.e. identifying what appears to be an object when in fact it is not an object) and false negatives (i.e. failing to identify an object). Embodiments of the method proposed herein address these problems.

In particular, embodiments of the method proposed herein may provide better indications of objects that were present and indicated in preceding frames but that may not be found and hence indicated in subsequent frames. For example, as the prior art makes no account of previous frames, it cannot track objects between frames. An object may become more difficult to identify with time, for example because its size within the frame has decreased or because it has moved in front of a different background or moved to overlap with another object. Generally this is seen as a decrease in the probability associated with that candidate object. This probability may decrease to be less than the threshold in which case the object will not be included in the output list and so will not be indicated.

In contrast, embodiments of the method proposed herein compares objects between successive frames to find corresponding pairs of candidate objects. Where a candidate object is found in the second frame that is determined to be the same object as a candidate object from the first frame, the probability for the object in the second frame is compared to the corresponding probability from the first frame. If the probability is found to decrease, the second set is amended to increase the probability for the candidate object. In this way, the probability of the candidate object either may be made not to decrease or may be made to decrease less quickly than would be the case in the prior art.

Optionally, amending the second set of candidate objects by increasing the probability that the determination as a candidate object is correct comprises increasing the probability based on the probability that the determination as a candidate object is correct from the first set of candidate objects. This may comprise increasing the probability based on a combination of the probability that the determination as a candidate object is correct from the first set of candidate objects and the probability that the determination as a candidate object is correct from the second set of candidate objects. For example, it may comprise increasing the probability as a weighted combination of the probability that the determination as a candidate object is correct from the first set of candidate objects and the probability that the determination as a candidate object is correct from the second set of candidate objects. The probability that the determination as a candidate object is correct from the first set of candidate objects may be given a greater weighting than the probability that the determination as a candidate object is correct from the second set of candidate objects.

The weighting given to the probability that the determination as a candidate object is correct from the first set of candidate objects may be in excess of X % and the weighting given to the probability that the determination as a candidate object is correct from the second set of candidate objects may be less than or equal to (100-X) %. X may be chosen to be 90 or more, for example 98. Adjusting X also adjusts the rate at which the probability decreases for an object across successive frames.

X may be set to 100 such that the probability that the object has been correctly determined is maintained undiminished between frames. However, a value less than 100 is currently preferred as it mitigates against endless propagation of a false positive. For example, an incorrectly identified object may persist in many frames as the probability will never diminish when X=100. Allowing the probability to decrease slowly will ensure an incorrectly identified object is lost as its probability will eventually fall below the threshold. The probabilities may be expressed in any way and need not be expressed as a percentage. For example, the probabilities may be expressed as values between 0 and 1. Thus references to a particular percentage provided herein should be taken to a reference to that percentage expressed in any other equivalent form. Hence, a probability of greater than 90% should be interpreted to include a probability greater than 0.9 and a probability greater than 9 in 10, etc.

Amending the second set of candidate objects by increasing the probability that the determination as a candidate object is correct may be performed only when one or more further conditions are met. An additional condition may be that the pair of corresponding objects in the first and second frame overlap by more than a threshold amount. The threshold amount may be by more than 50% (or by more than a half or the equivalent amount however expressed). This helps ensure the same object is tracked between frames as an object is unlikely to move far between frames. Alternatively or in addition, an additional condition may be that the probability that the determination as a candidate object is correct from the second set of candidate objects is greater than or equal to a threshold amount, for example a threshold amount of 40%.

Comparing the second set of candidate objects with the first set of candidate objects to identify pairs of corresponding objects that are determined to be the same object present in both the first and second frames may comprise the following steps. For at least some objects in one of the first and second set of candidate objects, at least one of (A) the size of the object, (B) the location of the object and (C) the probability that the determination as a candidate object is correct may be compared with the corresponding (A) size, (B) location or (C) probability for at least some of the objects in the other of the first and second set of candidate objects. This may be performed for all possible pairs of candidate objects. Alternatively, only some candidate objects from the first and second sets may be compared. For example, a specified number of the candidate objects from the first and second sets having the highest values for the probability that the determination as a candidate object is correct may be compared. An equal number candidate objects from each of the first and second sets may be compared. For example, candidate objects having the highest 25 probabilities from each of the first and second sets may be compared, which would require 625 comparisons.

Optionally, all of (A) the size, (B) the location and (C) the probability are compared. This determines the similarity of possible pairs of objects from the first and second sets (for each possible pair tested, one object of the pair is selected from the first set of candidate objects and one object of the pair is selected from the second set of candidate objects). Identifying pairs of corresponding objects that are determined to be the same object present in both the first and second frames may then comprise selecting the most similar pairs of objects from the comparisons made.

Comparing the size and/or location of the object and/or the probability that the determination as a candidate object is correct with the corresponding size, location and/or probability for the object in the other of the first and second set of candidate objects may comprise calculating a value that comprises a combination of two or three of the differences in (A) sizes, (B) locations and (C) probabilities. This combination may be a weighted combination or a summation.

The size of each candidate object may be expressed using horizontal and vertical dimensions relative to the frame width and frame height. The location of each candidate object may be expressed using horizontal and vertical co-ordinates relative to the frame width and frame height. The frame width may be set to 1 and the frame height may be set to 1 such that the horizontal and vertical dimensions and the horizontal and vertical coordinates have values between 0 and 1. The probabilities may be expressed between 0 and 1. Then, comparing the size and/or location of the object and/or the probability that the determination as a candidate object is correct with the corresponding size, location and probability for the object in the other of the first and second set of candidate objects may comprise calculating a summation of the differences in sizes, locations and probabilities. As all values are between 0 and 1, this summation may conveniently be an unweighted summation.

The size of candidate objects (e.g. each candidate object) of the first and second set of candidate objects may be defined by a bounding box. The bounding box may surround the candidate object. The horizontal and vertical dimensions may be the width and height of the bounding box. Alternatively or in addition, the size of selected objects (e.g. each selected object) of the output set of selected objects may be defined by a bounding box that surrounds the selected object and the horizontal and vertical dimensions may be the width and height of the bounding box. The horizontal and vertical co-ordinates may be the co-ordinates of the center of the bounding box.

Selecting objects from the amended second set of candidate objects to generate the output set of selected objects may comprise including candidate objects from the amended second set in the output set that have a probability that the determination as a candidate object is correct in excess of a threshold probability. The threshold probability may be 50%, although other values may be chosen for the threshold probability.

Outputting the output set may comprise outputting a datafile containing a list of the selected objects. The list may include a size and location of one or more of the selected objects in the output set, for example a size and location of each of the selected objects in the output set.

The method may comprise, for pairs of successive frames (and, optionally, for each pair of successive frames), displaying the second frame and highlighting at least one of the selected objects (optionally, all of the selected objects) from the output set in the second frame using the size and location of the selected object provided in the output set. Highlighting the at least one of the selected objects may comprise the display highlighting the position of the at least one of the selected objects in the current frame. For example, the bounding box of the at least one of the selected objects may be shown or a marker may be placed on, under or to the side of the at least one of the selected objects. The positions of the at least one of the selected objects in the previous frames may also be highlighted. For example, points may be placed to show previous positions or a line may be drawn through the previous positions, thereby allowing movement of the at least one of the selected objects to be tracked. The display may be associated with the video processor, for example a monitor used by an operator of the video processor.

Alternatively, the display may be provided remote from the video processor. For example, the method may comprise a server providing the output set to a client device, i.e. the methods described above may be performed by a server acting as a video processor. Then, the method may comprise using a display associated with the client device to display the second frame and to highlight at least one of the selected objects. The client device may be generating the video segment, for example using a camera associated with the client device. The video segment may be sent to the server to process the video segment as described above. The method may be performed in real time, such that at least one selected object may be displayed by the client device as it is recording the video segment.

There is also provided a video processor for providing an indication of objects in frames of a video segment, the video processor being configured to perform any of the above methods. The video processor may comprise at least one processor and a memory containing instructions executable by the at least one processor. The video processor may comprise modules, with a module for performing each of the method steps described above.

Hence, there is also provided a video processor for providing an indication of objects in frames of a video segment, the video processor being configured to, for a plurality of successive pairs of successive frames of the video segment, perform the following steps.

Analyze a first frame from the video segment and determine candidate objects in the frame.

Create a first set of candidate objects in the first frame that provides, for candidate objects in the first set, a size and location of the candidate object along with a probability that the determination as a candidate object is correct.

Analyze a second frame from the video segment and determine candidate objects in the second frame, wherein the first frame precedes the second frame.

Create a second set of candidate objects in the second frame that provides, for candidate objects in the second set, a size and location of the candidate object and a probability that the determination as a candidate object is correct.

Compare the second set of candidate objects with the first set of candidate objects to find pairs of corresponding candidate objects that are determined to be the same object present in both the first and second frames, with one object being selected from the second set of candidate objects and one object being selected from the first set of candidate objects.

For at least some pairs of corresponding objects found, determine whether the probability that the determination as a candidate object is correct from the second set of candidate objects is lower than the probability that the determination as a candidate object is correct from the first set of candidate objects. If the probability that the determination as a candidate object is correct from the second set of candidate objects is lower than the probability that the determination as a candidate object is correct from the first set of candidate objects, amend the second set of candidate objects by increasing the probability that the determination as a candidate object is correct such that the amended second set of candidate objects includes the increased probabilities.

Select objects from the amended second set of candidate objects and generate an output set of the selected objects that provides, for selected objects in the output set, a size and location of the selected object.

Output the output set.

Also, there is provided a video processor for providing an indication of objects in frames of a video segment, the video processor comprising at least one processor and a memory containing instructions executable by the at least one processor, whereby the video processor is operative to, for a plurality of successive pairs of successive frames of the video segment, perform the following steps.

Analyze a first frame from the video segment and determine candidate objects in the frame.

Create a first set of candidate objects in the first frame that provides, for candidate objects in the first set, a size and location of the candidate object along with a probability that the determination as a candidate object is correct.

Analyze a second frame from the video segment and determine candidate objects in the second frame, wherein the first frame precedes the second frame.

Create a second set of candidate objects in the second frame that provides, for candidate objects in the second set, a size and location of the candidate object and a probability that the determination as a candidate object is correct.

Compare the second set of candidate objects with the first set of candidate objects to find pairs of corresponding candidate objects that are determined to be the same object present in both the first and second frames, with one object being selected from the second set of candidate objects and one object being selected from the first set of candidate objects.

For at least some pairs of corresponding objects found, determine whether the probability that the determination as a candidate object is correct from the second set of candidate objects is lower than the probability that the determination as a candidate object is correct from the first set of candidate objects. If the probability that the determination as a candidate object is correct from the second set of candidate objects is lower than the probability that the determination as a candidate object is correct from the first set of candidate objects, amend the second set of candidate objects by increasing the probability that the determination as a candidate object is correct such that the amended second set of candidate objects includes the increased probabilities.

Select objects from the amended second set of candidate objects and generate an output set of the selected objects that provides, for selected objects in the output set, a size and location of the selected object.

Output the output set.

There is also provided a video processor for providing an indication of objects in frames of a video segment, the video processor comprising the following.

A module for analyzing a first frame from the video segment and for determining candidate objects in the frame.

A module for creating a first set of candidate objects in the first frame that provides, for candidate objects in the first set, a size and location of the candidate object along with a probability that the determination as a candidate object is correct.

A module for analyzing a second frame from the video segment and for determining candidate objects in the second frame, wherein the first frame precedes the second frame.

A module for creating a second set of candidate objects in the second frame that provides, for candidate objects in the second set, a size and location of the candidate object and a probability that the determination as a candidate object is correct.

A module for comparing the second set of candidate objects with the first set of candidate objects to find pairs of corresponding objects that are determined to be the same object present in both the first and second frames, with one object being selected from the second set of candidate objects and one object being selected from the first set of candidate objects.

A module for determining, for at least some pairs of corresponding objects found, whether the probability that the determination as a candidate object is correct from the second set of candidate objects is lower than the probability that the determination as a candidate object is correct from the first set of candidate objects and, if the determination as a candidate object is correct from the second set of candidate objects is lower than the probability that the determination as a candidate object is correct from the first set of candidate objects, for amending the second set of candidate objects by increasing the probability that the determination as a candidate object is correct such that the amended second set of candidate objects includes the increased probabilities.

A module for selecting objects from the amended second set of candidate objects and generating an output set of the selected objects that provides, for selected objects in the output set, a size and location of the selected object.

A module for outputting the output set, and wherein the modules are configured to process a plurality of successive pairs of successive frames of the video segment.

There is also provided a computer program comprising instructions which, when executed on at least one processor cause the at least one processor to carry out any of the methods described above. There is also provided a carrier containing such a computer program, wherein the carrier is one of an electronic signal, optical signal, radio signal or computer readable storage medium. There is also provided a computer readable storage medium having stored thereon such a computer program.

BRIEF DESCRIPTION OF THE DRAWINGS

FIG. 3 is an example of a table illustrating the values associated with the size and location of each candidate object for the first set or the second set of identified objects;

FIG. 6A is an example of a table illustrating summation tables produced in the step of calculating similarity as a summation of differences and storing the summation value in a summation table that is shown in FIG. 4, and FIGS. 6B and 6C illustrate how the summation table is amended during the step of removing all entries from the summation table shown in FIG. 4;

DETAILED DESCRIPTION

Figure 1:
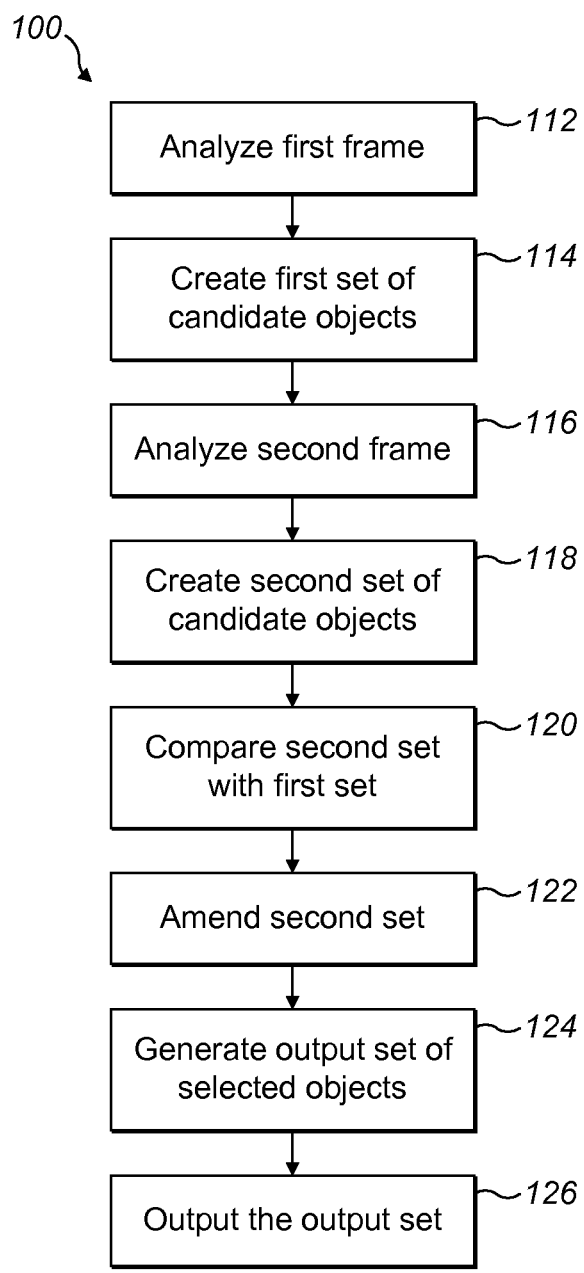
FIG. 1 schematically illustrates a method of using a video processor to provide an identification of objects in a frame of a video segment.

A method 100 of using a video processor to provide an identification of objects in a frame of a video segment is shown in FIG. 1. In particular, FIG. 1 shows a series of method steps 112 to 126 performed for a plurality of successive pairs of successive frames of the video segment.

The method 100 starts at step 112 where a first frame from the video segment is analyzed and candidate objects in the frame are determined. Then, at step 114, a first set of candidate objects in the first frame is created. The first set provides a size and location of the candidate object along with a probability that the determination as a candidate object is correct for candidate objects in the first set.

At step 116, a second frame from the video segment is analyzed and candidate objects in the second frame are determined. The first frame precedes the second frame in the video segment. Then, at step 118, a second set of candidate objects in the second frame is created. The second set provides a size and location of the candidate object and a probability that the determination as a candidate object is correct for candidates object in the second set.

The method continues to step 120 where the second set of candidate objects is compared with the first set of candidate objects to find pairs of corresponding candidate objects. The corresponding objects are determined to be the same object present in both the first and second frames. Hence, for a pair of corresponding objects found, one object is selected from the second set of candidate objects and one object is selected from the first set of candidate objects.

For at least some pairs of corresponding objects found, step 122 sees a determination as to whether the probability that the determination as a candidate object is correct from the second set of candidate objects is lower than the probability that the determination as a candidate object is correct from the first set of candidate objects. If the probability from the second set is lower than the probability from the first set, step 122 sees the second set of candidate objects amended by increasing the probability that the determination as a candidate object is correct such that the amended second set of candidate objects includes the increased probabilities.

At step 124, objects from the amended second set of candidate objects are selected and an output set of the selected objects is generated. The output set provides, for selected objects in the output set, a size and location of the selected object. Finally, at step 126, the output set is outputted.

Figure 2:
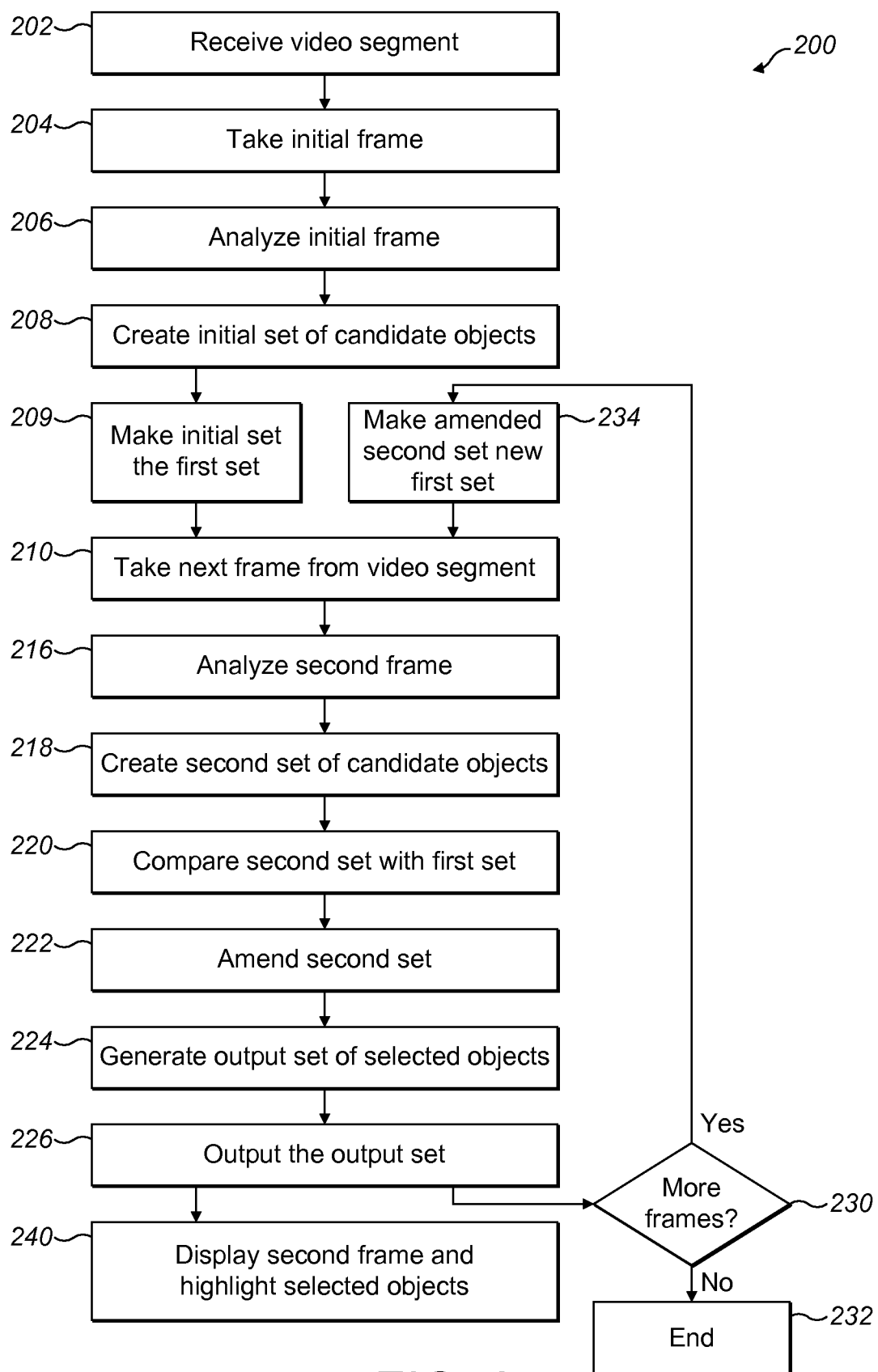
FIG. 2 schematically illustrates a method of using a video processor to provide an identification of objects in frames of a video segment according to an embodiment of the invention.

A method 200 of using a video processor to provide an identification of objects in frames of a video segment is shown in FIG. 2. The method starts at step 202 where a video segment is received by the video processor. The video processor may receive the video segment in different ways. For example, the video segment may be provided as a video feed, for example a streamed video feed. The video feed may be obtained from a live recording, and may optionally be obtained in real time. Alternatively, the video segment may be received by retrieving a video segment that was previously recorded and stored. For example, the video segment may be recorded on a storage medium such as a DVD or blu-ray disk, or a computer memory device such as a hard drive, flash drive, memory stick or memory card.

The video segment may be a complete video, for example a film or episode of a program. Alternatively, the video segment may be an excerpt from a longer video. The video segment may be received as part of the longer video, and the video processor may be used to create the video segment. For example, footage from a sports event may be received by the video processor, and the video processor may be used to create a video segment corresponding to highlights of the sporting event. The video segment may even be just a passage of play in a sporting event.

By way of example only, in the following description of FIG. 2, the video segment is described as a passage of play in a soccer match, for example a passage of play immediately preceding and including a goal being scored in a soccer match.

At step 202, the video processor takes the initial frame from the video segment, analyzes the initial frame at step 204 and determines candidate objects in the initial frame. Then, at step 206, an initial first set of candidate objects is created by the video processor. The initial set provides a size and location of the candidate object along with a probability that the determination as a candidate object is correct for candidate objects in the initial set.

An example of an initial set is shown in FIG. 3, where the set is presented in tabular form. Of course, the information in the set may be recorded and presented in many different ways and using many different data structures. FIG. 3 shows that the initial set, in this example, contains 4800 candidate objects.

For each candidate object, the location of the object is specified using x and y co-ordinates (labeled x and y respectively). Each candidate object is defined by a bounding box, and the x and y co-ordinates are for the center point of that bounding box. The values of the x and y co-ordinates are expressed as a fraction of the width and height of the frame respectively, such that they may range from 0 to 1. The bottom left of the frame is defined to be the origin with x,y co-ordinates of (0,0), whereas the top right corner of the frame is defined to have x,y co-ordinates of (1,1).

For each candidate object, the size of the object is specified by the width and height of the bounding box (labeled w and h respectively). The values of the width and height of the bounding box are expressed as a fraction of the width and height of the frame respectively, such that they may range from 0 to 1.

For each candidate object, the probability that the determination as a candidate object is correct is provided (labeled p). The probability is expressed as a value in the range 0 to 1.

Next, at step 209, the video processor makes the initial set the first set for the purposes of the following method steps 210 to 218, such that the initial frame becomes the first frame.

At step 210, the video processor takes the next frame from the video segment. When step 210 is performed for the first time, the next frame will be the second frame. This frame progressively increases frame by frame through the video segment as the method continues, as will be made clear in the following description. The next frame taken is made the second frame for the purposes of the following method steps 216 to 228 (irrespective of whether or not it is the second frame in the video segment).

At step 216, the video processor analyzes the second frame from the video segment and determines candidate objects. Then, at step 218, a second set of candidate objects in the second frame is created. The second set provides a size and location of the candidate object and a probability that the determination as a candidate object is correct for candidates object in the second set. The second set may correspond to the initial/first set and so may be represented as shown in FIG. 3.

Next, at step 220, the video processor compares the second set of candidate objects with the first set of candidate objects to find pairs of corresponding candidate objects. This step is essentially as have been described for step 120 of FIG. 1. This step is shown in greater detail in FIG. 4 and will be described in greater detail below.

The video processor performs steps 222 to 226 which essentially correspond to steps 122 to 126 from FIG. 1. Step 222 that sees the second set of candidate objects amended by increasing probabilities that the determination as a candidate object is correct in the second set when the video processor determines that the corresponding probability is greater for the corresponding candidate object in the first set is shown in more detail in FIG. 7 and is described below. Step 224 that generates the output set by selecting objects from the amended second set is shown in more detail in FIG. 8 and is described below.

At step 230, the video processor determines whether there are further frames from the video segment to be processed. If the current second frame is the final frame in the video segment, the method 200 may end at 232. If the final frame has not been reached, then the method loops back to step 234. At step 234, the video processor makes the amended second set the new first set (and hence the second frame becomes the new first frame), and then returns to step 210 where the video processor takes the next frame from the video segment and makes that the new second frame.

The method 200 then repeats through steps 216 to 230 such that a new amended second set of candidate objects is produced in step 222, from which the video processor generates and outputs a new output set at steps 224 and 226, before returning to step 230 where a check for further frames is performed once more. In this way, the video processor steps through each frame in the video segment, and processes each frame to provide an output set of selected objects that is based on the processing of the previous frames.

At the end of each iteration of method steps 210 to 226, the output set outputted at step 226 is used at step 240 to display the current second frame and to highlight at least one of the selected objects in the current second frame. For example, an overlay may be displayed with the current second frame to highlight the selected object(s).

There are many different ways of highlighting the selected object(s). For example, a marker may be placed under, above or to the side of the selected object(s), or the bounding box around the selected object(s) may be shown. Also, the color or brightness of the selected object(s) may be changed to highlight the selected object(s). The video processor may obtain the position of the selected object(s) in the frame to be highlighted from the selected set that provides the size and location of the selected objects. The size of the selected objects contained in the output set may be used to determine the size of the highlighting feature to be displayed with the selected object(s).

Some or all of the selected objects may be highlighted. For example, the video processor may automatically highlight all selected objects. Alternatively, the video processor may automatically highlight only some of the selected objects, such as those with the highest probability that the determination as a candidate object is correct. Also, a user may select which of the selected objects to highlight.

Returning to the example of the video segment being a passage of play in a soccer match, the selected objects may include the players in the soccer match. A user such as a pundit analyzing the soccer match for a television program may want to show the video segment, for example because the video segment includes a goal being scored. The user may select one of the players to show when a frame is displayed, for example to highlight a goal scorer. As successive frames are displayed, one particular object may be highlighted in each frame, such as the goal scorer. Furthermore, the position of the selected object(s) from the previous frames may be highlighted in the current second frame so as to track the movement of the selected object(s). For example, a player may be highlighted and a line drawn through the locations of the player in the previous frames. This may show a goal scorer's run that resulted in the goal being scored, or a defender's lack of movement that allowed an opposing player to score unchallenged. More than a single selected object may be shown at a time, for example both the goal scorer's run and the defender's lack of movement may be shown together. Alternatively, the ball may be highlighted and tracked through successive frames to show a number of competed passes during a passage of play.

In the above examples, the video processor may be used to display the second frame including the highlighted selected object(s). For instance, a video editing team at a media broadcaster may use the video processor to process the video segment and display the highlighted selected object(s) so that the editing team can choose which video segments to include in a broadcast program and which selected object(s), if any, to highlight in each frame. The resulting broadcast program may then be broadcast for viewing in remote locations, such that the video segments are displayed remotely, including frames with highlighted selected object(s).

A further example of how the present invention may be used will now be described. A further contemplated use is in assisting a field operative to identify an object. For example, an engineer may be sent to inspect, service or repair an item in a field location, and the engineer may require assistance in finding the object from amongst many other objects.

The engineer may have a mobile device equipped with a camera, a display and communication means. The mobile device may be a mobile phone, tablet or laptop computer. The engineer may use the mobile device to film at the field location, with the display of the mobile device showing the scene as it is being filmed.

In addition, the mobile device may transmit the video stream to a remote server that acts as a video processor. The server will then receive the video stream which will form the video segment to be processed. As each frame is received, the server may process the video segment as described with reference to FIG. 3. The server may perform further steps, for example to classify candidate objects and/or selected objects into one or more object classes. The item to be inspected, serviced or repaired may belong to a particular object class.

The server may then filter the second set, amended second set or output set to include only objects belonging to the same object class as the item to be inspected, serviced or repaired. The server may output the output set by transmitting it to the mobile device. The mobile device may then receive the output set, and use the output set to highlight the selected objects on the display. In this way, the engineer will see the view in front of the mobile device but that has been augmented to highlight items that are most likely to be the item to be inspected, serviced or repaired.

Alternatively, the server may not perform the filtering but instead send an unfiltered output set to the mobile device where the output set also contains an indication of the object class for the selected objects. The mobile device may then perform the filtering to remove all selected objects not in the same object class as the item to be inspected, serviced or repaired.

As a further alternative, shape matching may be used to identify the item from amongst the selected items. For example, the shape of each selected item may be compared with a library of images of the item to be inspected, serviced or repaired taken from different perspectives to identify matches. Only those selected items that appear to match may then be retained in the output set. This matching process may be performed by the server or the mobile device.

If necessary, to provide the necessary time for the transmission of signals and processing of the video segment, latency may be used in the display (i.e. the video captured by the camera may be displayed after a lag to allow the highlighting of the selected object(s) to be generated and added to the current frame for display).

Also, this real-time use of the method 200 of FIG. 2 may require control of timing. For example, step 234 that determines whether there are further frames to be processed may require a pause to account for the frame rate at which frames may be received or to account for delay in the network through which the video segment is transmitted. Hence, step 234 may comprise determining whether there are further frames from the video segment to be processed, and then continuing to monitor for the arrival of a new frame of the video segment to be processed for a predetermined time period.

Figure 4:
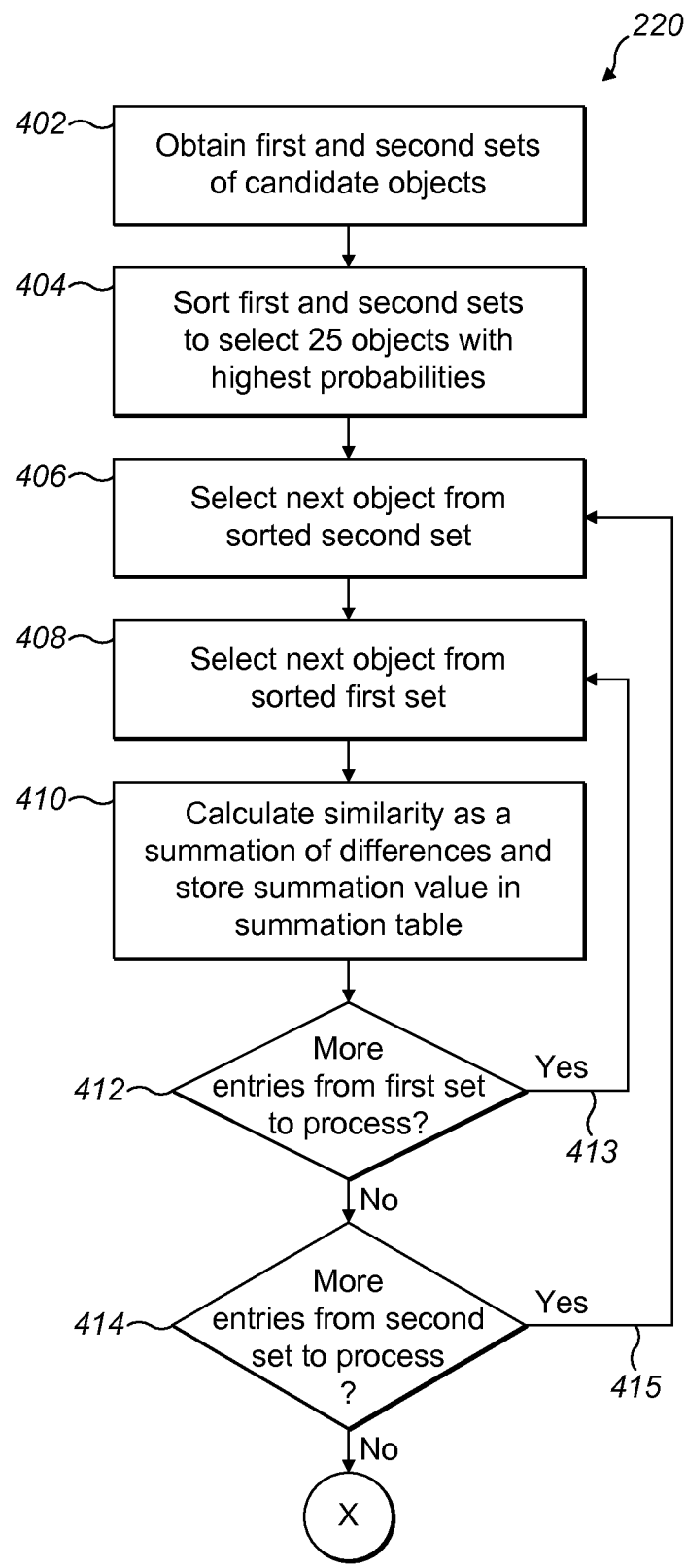
FIG. 4 schematically illustrates the step of comparing the second set with the first set shown in FIG. 2 in more detail.

Step 220 for FIG. 2 that sees the second set of candidate objects compared with the first set of candidate objects is shown in more detail in FIG. 4. Step 220 begins at 402 where the video processor obtains the first and second set of candidate objects. For example, the video processor may have saved the first and second sets to memory, and so the video processor may retrieve the first and second sets from memory.

Figures 4, 5:
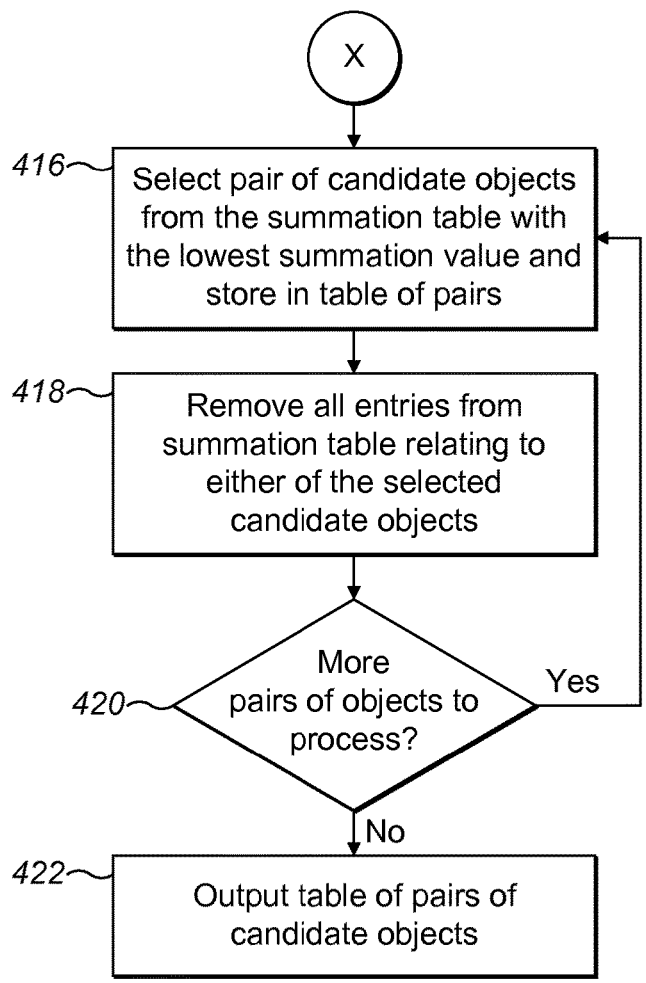
FIG. 5 is an example of a table illustrating the values associated with the size and location of each candidate object included in the sorted first set or the sorted second set.

At step 404, the video processor sorts the first and second sets according to the probability that the determination as a candidate object is correct, in order of decreasing probability. The video processor retains only the 25 candidate objects with the highest probability in each set, and rejects the lower ranked candidate objects to produce a sorted first set of candidate objects and a sorted second set of candidate objects. An example of the resulting sorted sets is shown in FIG. 5, where a table is shown to represent the 25 candidate objects listed in the first sorted set and also the second sorted set.

The video processor selects the next candidate object from the sorted second set at step 406. This will be the first candidate object the first time step 406 is performed, and hence the candidate object with the highest probability in the sorted second set.

Then, the method continues to step 408 where the video processor selects the next candidate object from the sorted first set. This will be the first candidate object the first time step 408 is performed, and hence the candidate object with the highest probability in the sorted first set.

At step 410, the video processor calculates the similarity between the selected objects from the sorted first and second sets. The video processor achieves this by summing the differences between corresponding values stored for the selected candidate objects in the sorted first and second sorted sets. The summation may be expressed as:

$$D(i,j)=|x_n(i)-x_{n-1}(j)|+|y_n(i)-y_{n-1}(j)|+|w_n(i)-w_{n-1}(j)|+|h_n(i)-h_{n-1}(j)|+|p_n(i)-p_{n-1}(j)|$$

where D is the summed difference, i is the $i^{th}$ candidate object from the second sorted set, j is the $j^{th}$ candidate object from the first sorted set, n denotes the current (second) frame such that n−1 denotes the previous (first) frame, x and y are the x and y co-ordinates that specify the location of the candidate object, w and h are the width and height of the candidate object and p is the probability that the determination as a candidate object is correct. The first time step 410 is performed, i=1 and j=1. The video processor stores the summed difference D(i,j) in a summation table like that shown in FIG. 6.

FIG. 6 shows a table of cells defined by columns representing i (i.e. different candidate objects from the second sorted set) and by rows representing j (i.e. different candidate objects from the first sorted set). Each cell contains the summed difference. As can be seen, in the present example, D(1,1) for the first candidate objects from the first and second sorted set has a summed difference of 0.8.

The summation table of FIG. 6A contains 625 entries, each entry corresponding to a unique pair of i and j and hence unique pair of candidate objects from the first and second sorted sets. To populate the summation table, a pair of best loops may be employed, as shown in FIG. 4.

An inner loop 413 ensures all 25 candidate objects from the first sorted set are compared with the currently selected candidate object from the sorted second set. This may be envisaged as the video processor performing a test at step 412 to determine whether all candidate objects from the sorted first set have been compared against the currently selected candidate object from the second det. If the outcome of this test is no, the method loops back to step 408 where the next candidate object from the first sorted set is selected. This new candidate object from the first set is then compared to the currently selected object from the second set as step 410 is repeated, and another value is stored in the summation table. The second time step 410 is performed, i=1 and j=2, and the video processor stores a value for D(1,2) in the summation table which FIG. 6A shows to be 0.1.

When all candidate objects from the sorted first set have been compared with the currently selected candidate object from the second set, the outcome of test 412 is yes and the method proceeds to select the next candidate object from the second sorted set. This is represented by the outer loop 415 in FIG. 4. This loop can be envisaged by a test at step 414 to determine whether any candidate objects from the sorted second set remain to be processed. If the answer is yes, the method loops back to step 406 where the video processor selects the next object from the sorted second set.

The video processor then performs steps 408 and 410 for each candidate object from the sorted first set as directed by the test at step 412 and inner loop 413. In this way, the entries for D(2,1), D(2,2,), . . . , D(2,25) are found for the summation table.

The outer loop repeats such that all the candidate objects from the sorted second set are selected. When all candidate objects from the sorted second set have been processed and hence the summation table is complete, the answer to test 414 is no and the method may proceed to step 416.

At step 416, the video processor finds the entry with the lowest value. In FIG. 6A, this is the entry for D(2,1). This lowest value represents the smallest summed difference and hence the associated i, j values of this value identify the pair of candidate objects that are most similar. This pair of candidate objects are selected by the video processor and stored in a table of pairs.

Then, at step 418, the video processor removes all entries from the summation table for the selected candidate objects such that they cannot be proposed for any other pairs of candidate objects (a candidate object from one frame can only match a single candidate object in another frame). This is illustrated in FIG. 6B where the values in the i=2 column and j=1 row are overwritten by a REALMAX value, where REALMAX denotes the largest floating-point number for a given computer architecture.

In this example, the video processor continues to find as many pairs as possible by performing a test at step 420 to determine whether any more pairs of objects need processing and, if the answer is yes, returning to step 416.

Each time step 416 is repeated, the video processor finds the lowest summed difference remaining in the summation table and selects the corresponding candidate objects as a pair and stores them in the table of pairs. The video processor then repeats step 418 to remove the entries relating to the newly selected pair of candidate objects from the summation table before returning to test step 420. FIG. 6C shows the summation table after the second pair with D(1,3) have been selected and their entries removed.

When all pairs of candidate objects have been found and stored in the table of pairs, the answer to test step 420 is no, and the method continues to step 422 where the video processor outputs the table of pairs of candidate objects. In this way, step 220 that compares the second set of candidate objects to the first set of candidate objects to find pairs of corresponding candidate objects is completed.

Figure 7:
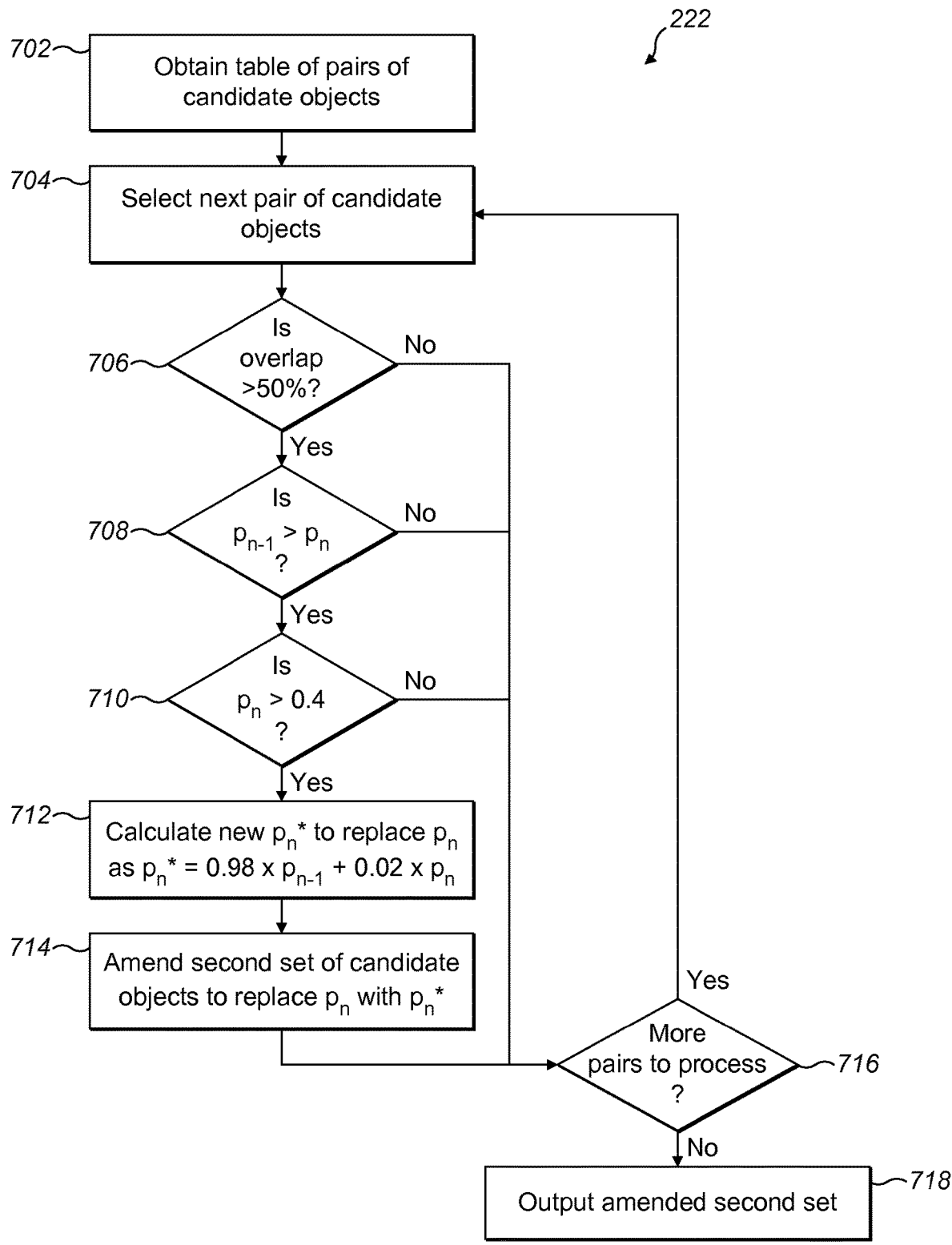
FIG. 7 schematically illustrates the step of amending the second set shown in FIG. 2 in more detail.

FIG. 7 shows how the table of pairs of candidate objects may be used in step 222 of FIG. 2 to amend the second set of candidate objects such that some candidate objects see an increase to their value for the probability that the determination as a candidate object is correct.

FIG. 7 starts at step 702 where the video processor obtains the table of pairs of candidate objects. As step 22 will normally follow immediately after step 220 has completed, the table of pairs of candidate objects may simply have remained in memory and so is readily accessible to the video processor.

At step 704, the video processor selects the next pair of candidate objects from the table. The table of pairs may or may not be ordered. In this example, there is no need to select pairs in any particular order and so there is no need to sort the pairs in the table.

Steps 706 to 710 see a series of three tests that are made by the video processor to determine whether to increase a candidate object's probability that the determination as a candidate object is correct. If any of the tests 706 to 710 produces a negative outcome, the probability is not increased and, as can be seen from FIG. 7, the method merely continues to test 716 where the video processor checks to see if any further pairs from the table of pairs require processing. If the answer is yes, the method returns to step 704 and the next pair is selected.

The first test at step 706 sees the video processor determine whether the currently selected pair of candidate objects overlap by more than 50% (other values may be chosen). This test may be performed by calculating whether $$|x_n - x_{n-1}| + |y_n - y_{n-1}| < (w_n + w_{n-1})/4 + (h_n + h_{n-1})/4$$

where x, y, w, h, n and n−1 are as described above.

If the outcome of this first test is positive, the video processor will continue to the second test at step 708. Step 708 sees the video processor determine whether the probability has decreased between the first and second frames, i.e. whether $p_{n-1} > p_n$.

If the outcome of this second test is positive, the video processor will continue to the third test at step 710. Step 710 sees the video processor determine whether the probability that the determination as a candidate object is correct for the second frame is greater than 0.4 (other values may be chosen).

If all three tests 706-710 provide positive results, the method continues to step 712 where the video processor calculates a new, increased probability that the determination as a candidate object is correct for the second set of candidate objects. The video processor calculates the increased probability $p^*_n$ from $$p^*_n = \lambda \times p_{n-1} + (1-\lambda) \times p_n$$

where $p_n$ and $p_{n-1}$ are as described above. In this example, $\lambda$ is set to be 0.98 although other values may be set.

At step 714, the video processor amends the second set such that the probability $p_n$ of the currently selected candidate object is replaced by the increased probability $p^*_n$. The method then continues to test 716 where the video processor determines whether there are more pairs of candidate objects from the table of pairs to be processed. When all pairs have been processed, the method continues to step 718 where the amended second set of candidate objects is output. This completes step 222 from FIG. 2 that sees the second set of candidate objects amended.

Figure 8:
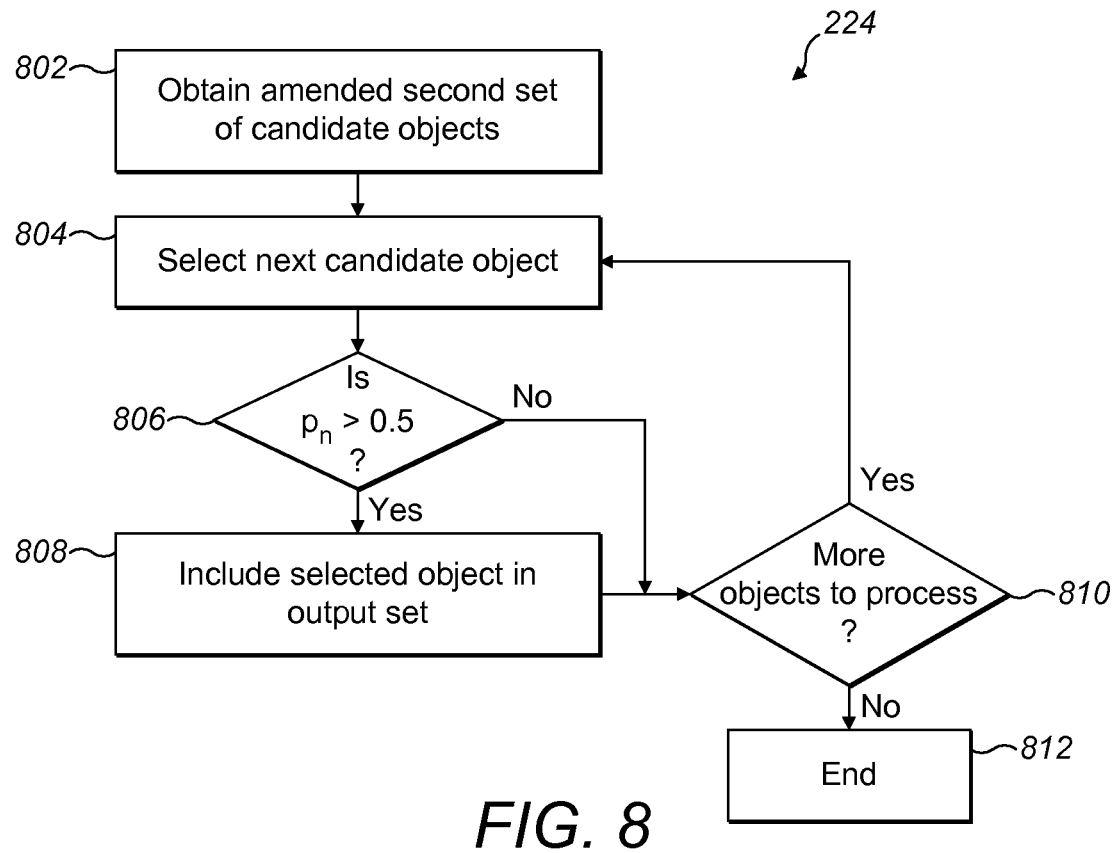
FIG. 8 schematically illustrates the step of generating an output set shown in FIG. 2 in more detail.

Step 224 from FIG. 2 that selects candidate objects and generates an output set of the selected objects is shown in greater detail in FIG. 8. At step 802, the video processor obtains the amended second set of candidate objects that was produced at step 718 of FIG. 7. At step 804, the video processor selects the next candidate object from the amended second set of candidate objects.

At step 806, the video processor compares the probability for the currently selected candidate object that the determination as a candidate object is correct against a threshold. That is, in this example, the video processor determines whether $p_n > 0.5$ (although other threshold values may be used). If the probability is greater than 0.5, the object is selected for inclusion in the output set. Thus, at step 808, the video processor adds the selected object to the output set. The video processor adds the location of the selected object to the output set, for example expressed in the same x and y co-ordinates as before. In this example, the video processor also adds the size of the selected object to the output set, for instance expressed using the same width and height as before. If the probability is not greater than 0.5, step 808 is bypassed such that the candidate object is not selected and added to the output set.

The method continues to step 810 where the video processor determines whether there are more candidate objects from the amended second set to be processed. If there are, the method returns to step 804 and the next candidate object is selected from the amended second set, and subjected to the threshold test at step 806. When all candidate objects from the amended second set have been processed, the step 224 ends at 812. The method of FIG. 2 may then continue to step 226 where the video processor outputs the output set.

Figure 9:
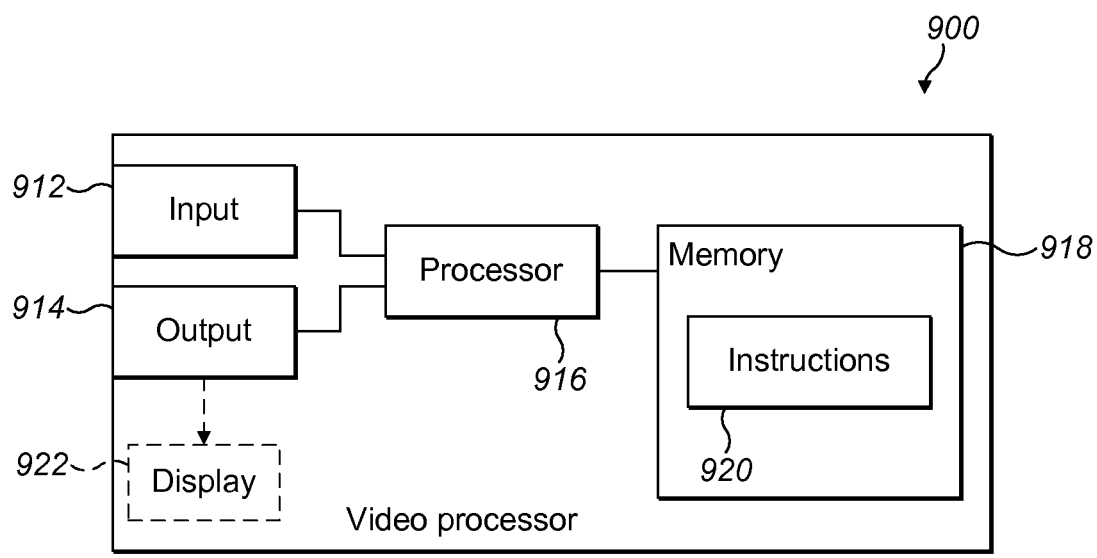
FIG. 9 schematically illustrates a video processor according to an embodiment of the invention.

FIG. 9 illustrates a processor-based implementation of a video processor 900 which may be used for implementing the above described concepts. As illustrated, the video processor 900 may include interfaces, namely an input 912 and an output 914. The input 912 may be used to receive the video segment in step 202 of FIG. 2. The output 914 may be used to output the output set of selected objects in step 226 of FIG. 2.

Further, the video processor 900 may include one or more processors 916 coupled to the input 12 and output 914, and one or more memories 918 coupled to the processor(s) 916. By way of example, the input 912, the output 914, the processor(s) 916, and the memory(ies) 918 could be coupled by one or more internal bus systems of the video processor 900. The memory(ies) 918 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory(ies) 918 may include suitably configured program code comprising instructions 920 to be executed by the processor(s) 918 so as to implement the above-described functionalities of a video processor 900, such as explained in connection with FIGS. 1, 2, 4, 7 and 8.

The video processor 900 may include one or more displays 922 which may be used to display frames from the video segment, including highlighted objects.

It is to be understood that the structures as illustrated in FIG. 9 are merely schematic and that the video processor 900 may actually include further components which, for the sake of clarity, have not been illustrated, e.g., further interfaces or processors. The components of the video processor 900 may be connected in series or to a bus, or in some other way. The video processor 900 may be occupy a single location or may be distributed across different locations. Hence, the video processor may also use one of more networks to allow communication between its distributed parts.

According to some embodiments, also a computer program may be provided for implementing functionalities of the video processor 900, e.g., in the form of a physical medium storing the program code and/or other data to be stored in the memory 918 or by making the program code available for download or by streaming.

Figure 10:
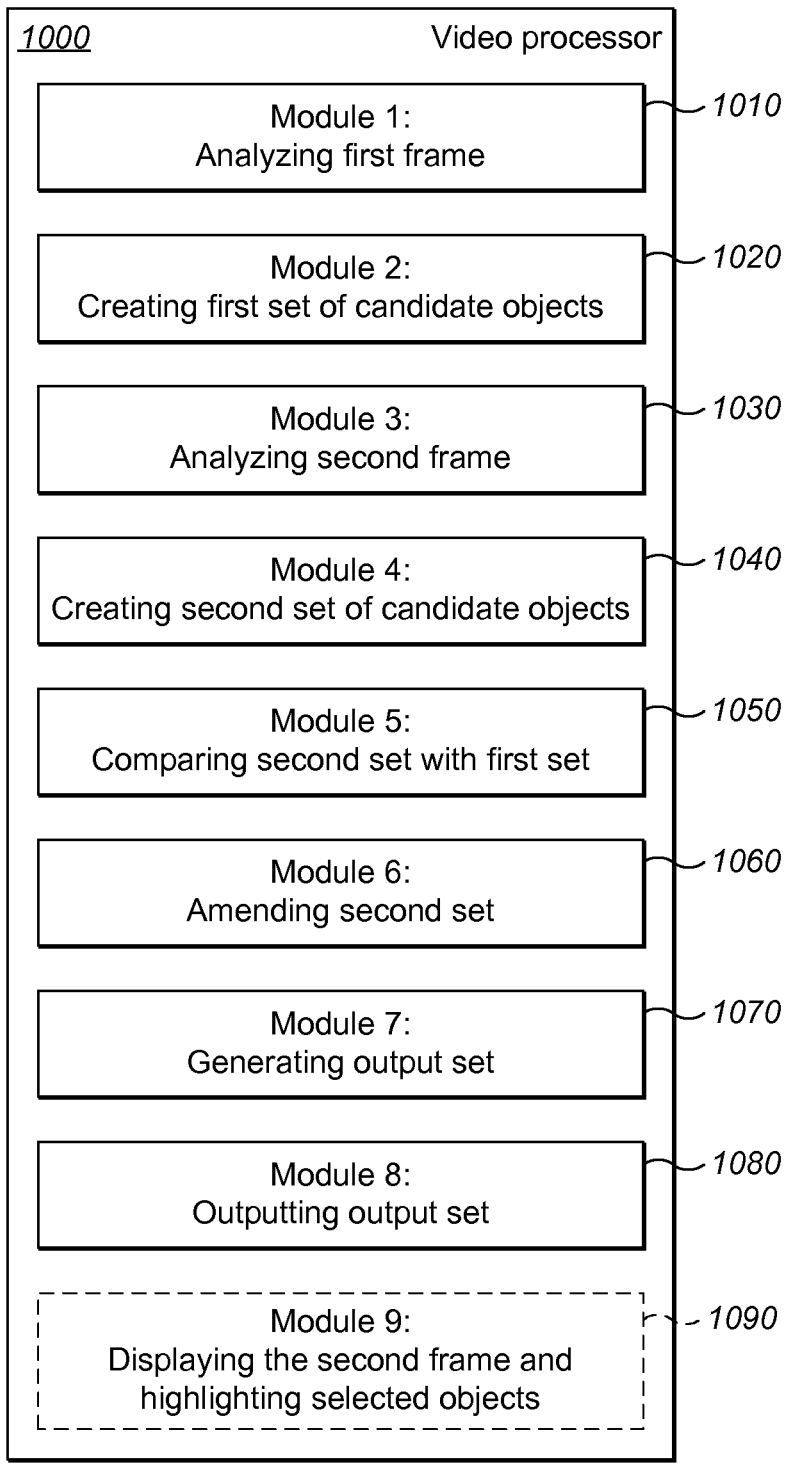
FIG. 10 schematically illustrates a video processor according to an embodiment of the invention.

FIG. 10 schematically illustrates a video processor 1000 for providing an indication of objects in frames of a video segment according to an embodiment of the invention. The video processor 1000 comprises a module 1010 for analyzing a first frame from the video segment and for determining candidate objects in the frame. The video processor 1000 also comprises a module 1020 for creating a first set of candidate objects in the first frame that provides, for candidate objects in the first set, a size and location of the candidate object along with a probability that the determination as a candidate object is correct.

The video processor 1000 also comprises a module 1030 for analyzing a second frame from the video segment and for determining candidate objects in the second frame, wherein the first frame precedes the second frame. The video processor 1000 further comprises a module 1040 for creating a second set of candidate objects in the second frame that provides, for candidate objects in the second set, a size and location of the candidate object and a probability that the determination as a candidate object is correct.

The video processor 1000 also comprises a module 1050 for comparing the second set of candidate objects with the first set of candidate objects to find pairs of corresponding objects that are determined to be the same object present in both the first and second frames, with one object being selected from the second set of candidate objects and one object being selected from the first set of candidate objects.

The video processor 1000 further comprises a module 1060 for determining, for at least some pairs of corresponding objects found, whether the probability that the determination as a candidate object is correct from the second set of candidate objects is lower than the probability that the determination as a candidate object is correct from the first set of candidate objects and, if the probability that the determination as a candidate object is correct from the second set of candidate objects is lower than the probability that the determination as a candidate object is correct from the first set of candidate objects, for amending the second set of candidate objects by increasing the probability that the determination as a candidate object is correct such that the amended second set of candidate objects includes the increased probabilities.

The video processor 1000 also comprises a module 1070 for selecting objects from the amended second set of candidate objects and generating an output set of the selected objects that provides, for selected objects in the output set, a size and location of the selected object, along with a module 1080 for outputting the output set.

Optionally, the video processor 1000 may comprise a module 1090 for displaying the second frame and highlighting at least one of the selected objects from the output set in the second frame using the size and location of the selected object provided in the output set.

The modules 1010 to 1090 are configured to process a plurality of successive pairs of successive frames of the video segment.

Those skilled in the art will appreciate that some variations and modifications may be made to the methods and apparatus described above without departing from the inventive concept that is defined by the appended claims.

For example, FIG. 4 shows an inner loop 413 that sees successive candidate objects selected from the sorted first set of candidate objects. The outer loop 415 then sees successive candidate objects selected from the sorted second set of candidate objects. However, this could be reversed such that the inner loop 413 steps through the sorted first set of candidate objects and the outer loop 415 steps through the sorted second set of candidate objects.

Also, how the size and location of the candidate objects and/or selected objects are specified may be varied. While the location of the candidate objects and/or selected objects may be specified as the center point of the bounding box enclosing the candidate object and/or selected object, any other point may be taken. For example, one of the corner points of the bounding box could be used to specify the location. Furthermore, the co-ordinates and width and height of the candidate objects and/or selected objects need not be expressed using scales of 0 to 1. For example, pixel values may be used instead.

Step 220 of FIG. 2 that sees the second set of candidate objects compared with the first set of candidate objects uses an unweighted summation of differences in the sizes, locations and probabilities. However, a weighted combination may be used where each difference is scaled by a weighting factor before being summed. The weighting factors may be chosen to give more weight to certain factors, for example more weight to the probabilities.

The present invention may be extended to account for objects that are classified into different object types or classes. For example, steps 112, 116, 206 and 216 may include recognizing an object class for each of the candidate objects. Then, steps 114, 118, 208 and 218 may also include providing the object class for each candidate object in the sets of candidate objects. Moreover, probabilities may be provided for each candidate object that reflects the probability that the determination as a candidate object is correct for each object class. For example, if two object classes A and B are included, then the single probability p may be replaced by two probabilities $^A p$ and $^B p$. Then, step 410 may be modified such that the video processor calculates summation as:

$$D(i,j)=|x_n(i)-x_{n-1}(j)|+|y_n(i)-y_{n-1}(j)|+|w_n(i)-w_{n-1}(j)|+|h_n(i)-h_{n-1}(j)|+|^A p_n(i)-^A p_{n-1}(j)|+|^B p_n(i)-^B p_{n-1}(j)|$$

Also, steps 708 and 710 from FIG. 7 may be modified to compare the larger of two probabilities. For example, step 708 may whether $^A p_{n-1} > ^A p_n$ when $^A p_n > ^B p_n$ or otherwise determining whether $^B p_{n-1} > ^B p_n$. Likewise, step 710 may comprise determining whether the larger of $^A p$ and $^B p$ is greater than 0.4. If step 712 is performed because tests 706 to 710 have been passed, the greater of $^A p$ and $^B p$ may be increased. For example, if $^A p$ is greater, then step 712 comprises calculating the increased probability $^A p^*_n$, from $$^A p^*_n = \lambda \times ^A p_{n-1} + (1-\lambda) \times ^A p_n.$$

As will be apparent to those skilled in the art, this method may be scaled from the two object classes described above to however many object classes are required.

The invention claimed is:

1. A method of providing an indication of objects in frames of a video segment, the method comprising, for a plurality of successive pairs of successive frames of the video segment:
   analyzing a first frame from the video segment and determining candidate objects in the frame;
   creating a first set of candidate objects in the first frame that provides, for candidate objects in the first set, a size and location of the candidate object along with a probability that the determination as a candidate object is correct;
   analyzing a second frame from the video segment and determining candidate objects in the second frame, wherein the first frame precedes the second frame;
   creating a second set of candidate objects in the second frame that provides, for candidates object in the second set, a size and location of the candidate object and a probability that the determination as a candidate object is correct;
   comparing the second set of candidate objects with the first set of candidate objects to find pairs of corresponding candidate objects that are determined to be the same object present in both the first and second frames, with one object being selected from the second set of candidate objects and one object being selected from the first set of candidate objects;
   for at least some pairs of corresponding objects found, determining whether the probability that the determination as a candidate object is correct from the second set of candidate objects is lower than the probability that the determination as a candidate object is correct from the first set of candidate objects and, if the probability that the determination as a candidate object is correct from the second set of candidate objects is lower than the probability that the determination as a candidate object is correct from the first set of candidate objects, amending the second set of candidate objects by increasing the probability that the determination as a candidate object is correct such that the amended second set of candidate objects includes the increased probabilities;
   selecting objects from the amended second set of candidate objects and generating an output set of the selected objects that provides, for selected objects in the output set, a size and location of the selected object; and
   outputting the output set.

2. The method of claim 1, wherein amending the second set of candidate objects by increasing the probability that the determination as a candidate object is correct comprises any one of:
increasing the probability based on the probability that the determination as a candidate object is correct from the first set of candidate objects;
increasing the probability based on a combination of the probability that the determination as a candidate object is correct from the first set of candidate objects and the probability that the determination as a candidate object is correct from the second set of candidate objects; and
increasing the probability as a weighted combination of the probability that the determination as a candidate object is correct from the first set of candidate objects and the probability that the determination as a candidate object is correct from the second set of candidate objects, and wherein the probability that the determination as a candidate object is correct from the first set of candidate objects is given a greater weighting than the probability that the determination as a candidate object is correct from the second set of candidate objects, optionally wherein the weighting given to the probability that the determination as a candidate object is correct from the first set of candidate objects is in excess of 90% and the weighting given to the probability that the determination as a candidate object is correct from the second set of candidate objects is less than or equal to 10%, optionally with weightings of 98% and 2%.

3. The method of claim 1, wherein amending the second set of candidate objects by increasing the probability that the determination as a candidate object is correct is performed only when a further condition is met, wherein the further condition is one of:
a condition that the pair of corresponding objects in the first and second frame overlap by more than a threshold amount, optionally by more than 50%; and
a condition that the probability that the determination as a candidate object is correct from the second set of candidate objects is greater than or equal to a threshold amount, optionally 40%.

4. The method of claim 1, wherein selecting objects from the amended second set of candidate objects to generate the output set of selected objects comprises including candidate objects from the amended second set in the output set that have a probability that the determination as a candidate object is correct in excess of a threshold probability, for example a threshold probability of 50%.

5. A non-transitory computer readable storage medium having stored thereon a computer program comprising instructions which, when executed on at least one processor cause the at least one processor to carry out the method according to claim 1.

6. The method of claim 1, wherein the size of each candidate object of the first and second set of candidate objects is defined by a bounding box that surrounds the candidate object and wherein the horizontal and vertical dimensions are the width and height of the bounding box, and/or wherein the size of each selected object of the output set of selected objects is defined by a bounding box that surrounds the selected object and wherein the horizontal and vertical dimensions are the width and height of the bounding box.

7. The method of claim 6, wherein the horizontal and vertical co-ordinates are the co-ordinates of the center of the bounding box.

8. The method of claim 1, further comprising, for each pair of successive frames, displaying the second frame and highlighting at least one of the selected objects from the output set in the second frame using the size and location of the selected object provided in the output set.

9. The method of claim 8, wherein highlighting the at least one of the selected objects comprises displaying a current frame highlighting the position of the at least one of the selected objects in the current frame and highlighting the positions of the at least one of the selected objects in a previous frame.

10. The method of claim 1, wherein comparing the second set of candidate objects with the first set of candidate objects to identify pairs of corresponding objects that are determined to be the same object present in both the first and second frames comprises:
for at least some of the objects in one of the first and second set of candidate objects, comparing the size and location of the object and the probability that the determination as a candidate object is correct with the corresponding size, location and probability for at least some of the objects in the other of the first and second set of candidate objects thereby determining the similarity of the pair of objects, with one object of the pair being selected from the first set of candidate objects and one object of the pair being selected from the second set of candidate objects; and
wherein identifying pairs of corresponding objects that are determined to be the same object present in both the first and second frames comprises selecting the most similar pairs of objects.

11. The method of claim 10, wherein comparing the size and location of the object and the probability that the determination as a candidate object is correct with the corresponding size, location and probability for the object in the other of the first and second set of candidate objects comprises calculating a value that comprises a combination, optionally a weighted combination or a summation, of the differences in sizes, locations and probabilities.

12. The method of claim 11, wherein the size of each candidate object is expressed using horizontal and vertical dimensions relative to the frame width and frame height and the location of each candidate object is expressed using horizontal and vertical co-ordinates relative to the frame width and frame height.

13. A video processor for providing an indication of objects in frames of a video segment, the video processor comprising at least one processor and memory containing instructions executable by the at least one processor, whereby the video processor is operative, for a plurality of successive pairs of successive frames of the video segment, to:
analyze a first frame from the video segment and determine candidate objects in the frame;
create a first set of candidate objects in the first frame that provides, for candidate objects in the first set, a size and location of the candidate object along with a probability that the determination as a candidate object is correct;
analyze a second frame from the video segment and determine candidate objects in the second frame, wherein the first frame precedes the second frame;
create a second set of candidate objects in the second frame that provides, for candidate objects in the second set, a size and location of the candidate object and a probability that the determination as a candidate object is correct;

compare the second set of candidate objects with the first set of candidate objects to find pairs of corresponding candidate objects that are determined to be the same object present in both the first and second frames, with one object being selected from the second set of candidate objects and one object being selected from the first set of candidate objects;

for at least some pairs of corresponding objects found, determine whether the probability that the determination as a candidate object is correct from the second set of candidate objects is lower than the probability that the determination as a candidate object is correct from the first set of candidate objects and, if the probability that the determination as a candidate object is correct from the second set of candidate objects is lower than the probability that the determination as a candidate object is correct from the first set of candidate objects, amend the second set of candidate objects by increasing the probability that the determination as a candidate object is correct such that the amended second set of candidate objects includes the increased probabilities;

select objects from the amended second set of candidate objects and generate an output set of the selected objects that provides, for selected objects in the output set, a size and location of the selected object; and output the output set.

14. The video processor of claim 13, operative further to amend the second set of candidate objects by increasing the probability that the determination as a candidate object is correct by any one of:

increasing the probability based on the probability that the determination as a candidate object is correct from the first set of candidate objects;

increasing the probability based on a combination of the probability that the determination as a candidate object is correct from the first set of candidate objects and the probability that the determination as a candidate object is correct from the second set of candidate objects; and increasing the probability as a weighted combination of the probability that the determination as a candidate object is correct from the first set of candidate objects and the probability that the determination as a candidate object is correct from the second set of candidate objects, and wherein the probability that the determination as a candidate object is correct from the first set of candidate objects is given a greater weighting than the probability that the determination as a candidate object is correct from the second set of candidate objects, optionally wherein the weighting given to the probability that the determination as a candidate object is correct from the first set of candidate objects is in excess of 90% and the weighting given to the probability that the determination as a candidate object is correct from the second set of candidate objects is less than or equal to 10%, optionally with weightings of 98% and 2%.

15. The video processor of claim 13, operative further to amend the second set of candidate objects by increasing the probability that the determination as a candidate object is correct is performed only when a further condition is met, wherein the further condition is one of:

a condition that the pair of corresponding objects in the first and second frame overlap by more than a threshold amount, optionally by more than 50%; and a condition that the probability that the determination as a candidate object is correct from the second set of candidate objects is greater than or equal to a threshold amount, optionally 40%.

16. The video processor of claim 13, wherein selecting objects from the amended second set of candidate objects to generate the output set of selected objects comprises including candidate objects from the amended second set in the output set that have a probability that the determination as a candidate object is correct in excess of a threshold probability, for example a threshold probability of 50%.

17. The video processor of claim 13, operative further to compare the second set of candidate objects with the first set of candidate objects to identify pairs of corresponding objects that are determined to be the same object present in both the first and second frames by:

for at least some of the objects in one of the first and second set of candidate objects, comparing the size and location of the object and the probability that the determination as a candidate object is correct with the corresponding size, location and probability for at least some of the objects in the other of the first and second set of candidate objects thereby determining the similarity of the pair of objects, with one object of the pair being selected from the first set of candidate objects and one object of the pair being selected from the second set of candidate objects; and wherein identifying pairs of corresponding objects that are determined to be the same object present in both the first and second frames comprises selecting the most similar pairs of objects.

18. The video processor of claim 17, operative further to compare the size and location of the object and the probability that the determination as a candidate object is correct with the corresponding size, location and probability for each object in the other of the first and second set of candidate objects by calculating a value that comprises a combination, optionally a weighted combination or a summation, of the differences in sizes, locations and probabilities.

19. The video processor of claim 13, operative further, for each pair of successive frames, to output for display the second frame including highlighting of at least one of the selected objects from the output set in the second frame using the size and location of the selected object provided in the output set.

20. The video processor of claim 19, operative further to output for display a current frame including highlighting in the current frame the at least one of the selected objects by highlighting the position of the at least one of the selected objects in the current frame and highlighting the positions of the at least one of the selected objects in a previous frame.

* * * * *